United States Patent [19]

Smith

[11] Patent Number: 4,531,537

[45] Date of Patent: Jul. 30, 1985

[54] PLUG VALVE FOR REDUCED LEAKAGE

[75] Inventor: Russell G. Smith, Cincinnati, Ohio

[73] Assignee: Xomox Corporation, Cincinnati, Ohio

[21] Appl. No.: 357,416

[22] Filed: Mar. 12, 1982

Related U.S. Application Data

[63] Continuation of Ser. No. 142,611, Apr. 21, 1980, abandoned.

[51] Int. Cl.³ .............................................. F16K 5/22
[52] U.S. Cl. .............................. 137/246.22; 251/175; 251/214; 251/309; 277/59
[58] Field of Search ................... 277/19, 59, 106, 124; 251/214, 309, 310, 335 A, 175; 137/246.22

[56] References Cited

U.S. PATENT DOCUMENTS

| | | | |
|---|---|---|---|
| 3,703,910 | 11/1972 | Smith | 137/375 |
| 4,116,208 | 9/1978 | Smith | 137/1 |
| 4,135,544 | 1/1979 | Macleod | 137/246.22 |
| 4,174,092 | 11/1979 | Macleod | 251/214 |
| 4,219,046 | 8/1980 | West et al. | 251/309 |

Primary Examiner—A. Michael Chambers
Attorney, Agent, or Firm—Kinney & Schenk

[57] ABSTRACT

A plug valve has an actuating stem which is non-integral with the valve plug. The actuating stem is axially movable with respect to the valve plug to compressingly and sealingly engage an external sealing member in response to fluid pressure. The plug wedges itself into sealing engagement in response to fluid pressure.

15 Claims, 3 Drawing Figures

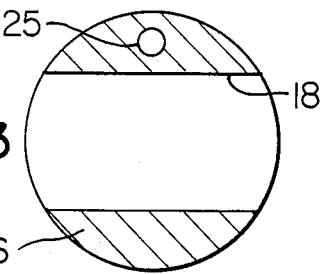
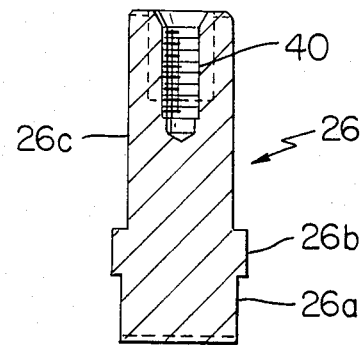
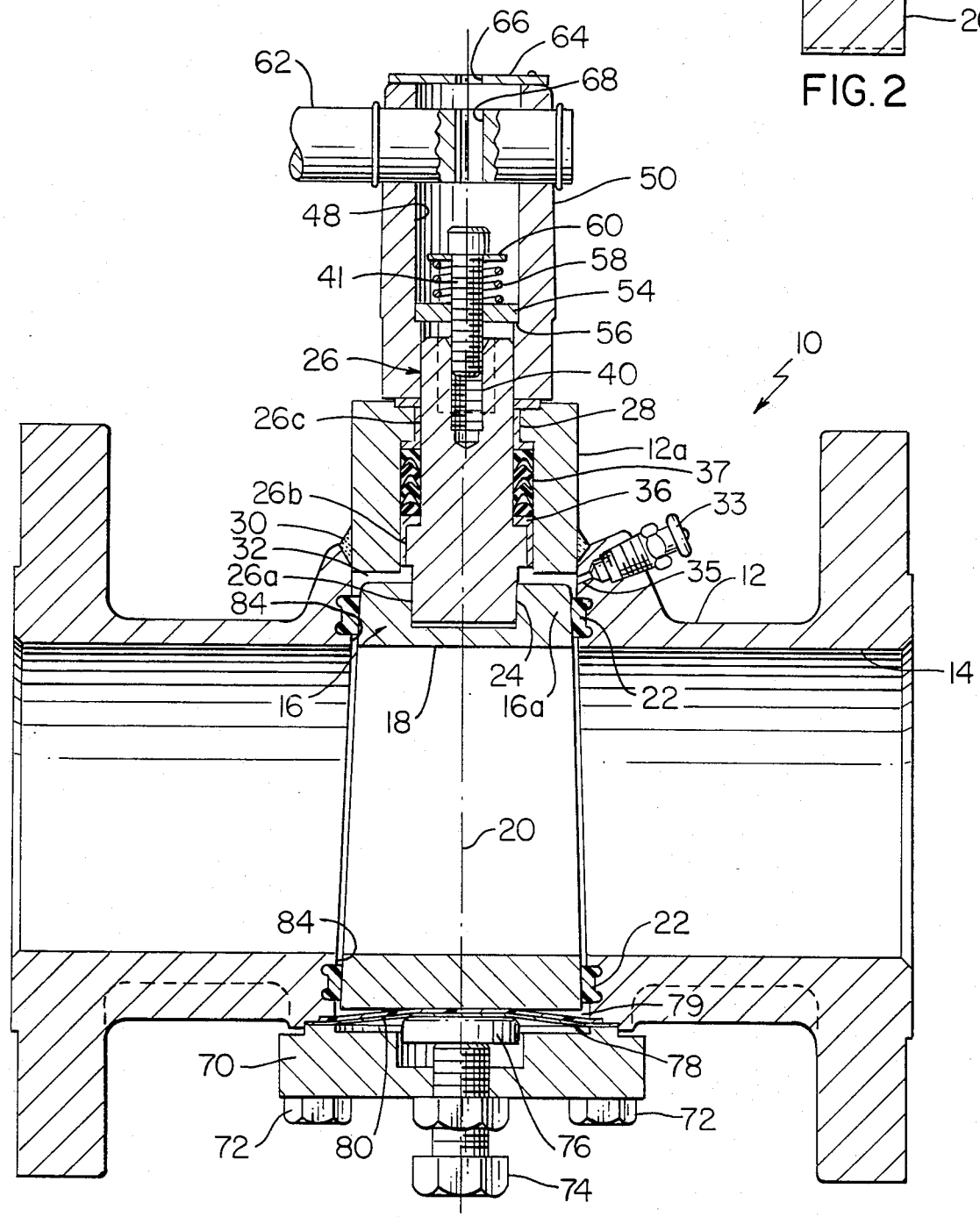

PLUG VALVE FOR REDUCED LEAKAGE

This is a continuation of application Ser. No. 142,611 filed Apr. 21, 1980, now abandoned.

BACKGROUND OF THE INVENTION

The present invention relates generally to plug valves and more particularly concerns a plug valve with a separate and discrete actuating stem which is useful in virtually eliminating any leakage of fluid from a process line. The invention will be disclosed, by way of example, in connection with an inverted plug valve having pressure chambers with disparate surface areas on opposite ends of the valve plug which serve to shift the valve in a direction traverse to the flow direction to reestablish a sealing relationship whenever leakage occurs. The invention includes a discrete and separate actuating stem for the plug to permit the plug to be axially shaftable in a piston like manner to sealingly interact with a packing disposed about the stem. In the preferred embodiment, this plug is pressure biased against the packing by a pressurized buffering media.

Considerable activity has been directed in recent years to the development of valves which use various types of non-metallic materials adapted to withstand the damaging effects of corrosive fluids, high pressures and various other elements encountered in the control of piped liquids and gases. The material employed is usually a gas and liquid impervious material such as TEFLON or an equivalent substance which provides an excellent seal under proper conditions of use, while at the same time offering minimal resistance to valve plug rotation, particularly in the case of larger valves.

Leakage may be characterized as either internal or external. Internal leakage occurs whenever fluid escapes past a closed valve member, and through the pipe or conduit which is being valved. External leakage is characterized by fluid which escapes to the atmosphere, usually through the valve member. It is obviously important to eliminate or reduce both types of leakage.

The need for leak-proof valves which eliminate atmospheric leakage has been highlighted recently due to sensitized concerns relating to ecology. There is thus a growing desire and need for valves which reduce atmospheric leakage to a nearly zero level and which also reduce internal leakage. In fact, in some instances and for some fluids, rigorous standards dictate the maximum permissable atmospheric leakage.

Leakage problems are frequently aggravated and compounded when the valve is subjected to temperature changes. The non-metallic sealing material generally has a much higher coefficient of expansion than the metals from which the main part of the valve is formed. As a result, the sealing material will expand far more and, under some circumstances, may even cold flow, that is, take a permanent set or change in shape or dimension. When subsequently subjected to cooler temperatures, these seals provide a relatively loose fit for the plug member.

One prior art solution to these problems in the past is illustrated in U.S. Pat. No. 3,472,485. This solution included the use of a valve plug with a separate actuating stem which permitted downstream shifting of the plug in response to line pressure if and when a sealing relationship was lost. U.S. Pat. No. 3,263,697 also permitted downstream shifting of the plug and, in addition, permitted transverse shifting of the valve actuating stem.

Another prior art solution has included the use of a high pressure inert buffering media at all potential leak paths of the valve. The buffering media is maintained at pressure which is in excess of the line pressure for the valved fluid to reduce leakage. One example of a method and apparatus for such pressure buffering of leak paths is shown in U.S. Pat. No. 4,116,208.

The present invention is in many regards similar to that disclosed in the aforementioned U.S. Pat. No. 3,263,697 but makes important changes thereover to further permit interaction of the actuating stem with a packing member to augment a seal to prevent external leakage.

Accordingly, it is an object of the present invention to provide a plug valve which effectively prevents both internal and external leakage.

It is a further object of the present invention to provide a plug valve which is pressure responsive and in which the valve stem moves relatively to the valve body to compensate for any loss in the sealing relationship between the valve stem and the valve housing.

It is still another object of the present invention to provide a plug valve with a discrete and separate activating stem which moves in a direction transverse to the fluid flow to sealingly engage an external sealing member.

It is still another object of the present invention to provide a plug valve which maintains an effective seal when subjected to temperature changes.

It is still another object of the present invention to provide a valve plug with an activating stem which moves axially with respect to the valve plug and the valve plug's rotational axis to compressingly engage an external sealing member in response to fluid leakage past an internal sealing member.

It is yet another object of the present invention to provide an actuating stem which is constantly urged to a sealing relationship against an external sealing member by a pressurized buffering media.

SUMMARY OF THE INVENTION

In accordance with the invention, a plug valve has a valve housing with a flow passage therethrough and a plug member rotatively fitted within the passage to control fluid flow through the passage in accordance to the plug's angular position with respect to the housing. A non-integral actuating stem operatively interacts with an end portion of the valve plug and axially extends therefrom in a direction transverse to the flow passage to rotate the plug relative to the valve body. The stem has at least three discrete sections including an intermediate shoulder section having a greater diametrical dimension than axially adjacent sections. An external sealing member is circumferentially disposed about a second axially adjacent to the shoulder on the opposite side of the shoulder with respect to the valve plug. The valve has a variable volume chamber at least partially defined by the end of the plug interacting with the stem, the valve housing and the axial side of the stem shoulder opposite the external sealing member. The invention includes means for permitting axial movement of the stem in response to fluid pressure in the chamber to compressingly and sealingly interact the shoulder and the packing member. Thus, the actuating stem moves transverse to the flow passage in a piston like manner to compressingly engage the external sealing member whenever fluid pressure is communicated to the chamber.

In accordance with another aspect of the invention, a pressurized buffering media is applied to the valve internally of the external sealing member to constantly urge an anxially movable actuating stem into a sealing relationship with the external sealing member.

BRIEF DESCRIPTION OF THE DRAWINGS

Other objects and advantages of the invention will be apparent upon reading the following detailed description and upon reference to the drawings in which:

FIG. 1 is a cross sectional elevational view of an inverted plug valve utilizing one form of the present invention.

FIG. 2 is a cross sectional elevational view of the actuating stem used in the embodiment of FIG. 1.

FIG. 3 is a cross sectional view of the valve plug of FIG. 1 taken in the direction of line 3—3 of FIG. 1.

While the invention will be described in connection with a preferred embodiment, it will be understood that it is not intended to limit the invention to that embodiment. On the contrary, it is intended to cover all alternatives, modifications and equivalents as may be included within the scope and spirit of the invention as defined by the appended claims.

DETAILED DESCRIPTION OF THE PREFERRED EMBODIMENT

Referring now to the drawings and to FIG. 1 in particular, a plug valve 10 having a housing 12 with an internal bore 14 extending therethrough is shown. The internal bore 14 defines a fluid flow passage through the housing 12. A valve plug 16 is rotatably fitted within the housing 12 to extend across the flow passage 14 to control fluid flow through the flow passage 14 in accordance to the plug's (16) angular position relative to the housing 12. The valve plug 16 has a through opening or passageway 18 therein, as is usual, to be placed in and out of registry with the flow passage 14 incident to partial rotation of the valve plug 16. The valve 10 and the valve plug 16 in particular is shown in an open position in the depiction of FIG. 1. In this open position, the fluid passage 18 registers with the flow passage 14. Although not shown, it will be readily appreciated by those skilled in the art, that the valve plug 16 is designed to be rotated about a central axis 20 to place its fluid passage 18 out of registry with that of the housing (fluid passage 14) to completely cut off flow through the fluid passage 14.

A sealing member 22 in the form of a sleeve or liner formed of TEFLON or equivalent material circumscribes the periphery of the plug and is apertured in correspondency with the valve plug 16 to permit the registry of fluid passage 14 and 18 whenever the valve is in the open position. Like the valve plug 16, the sealing member 22 extends across the flow passage 14 with projections extending radially outward from the plug member to snugly fit within mating grooves on opposite sides of the flow passage 14. The sealing member 22 is disposed between the valve plug 16 and the housing 12 and is designed to provide a sealing fit between those two elements.

The upper surface 16a of valve plug 16 has a female recess 24 on its upper side. An actuating stem or shaft 26 is fitted in this recess 24 with side portions 26a of actuating stem 26 being operative to transmit a torque couple to the valve plug 16 and to effectuate rotary movement of that plug 16 about its axis 20 to move the plug 16 between open and closed positions.

As seen in both FIG. 1 and FIG. 2, side portion 26a of the valve stem 26 extends axially upward beyond the terminus of the valve plug 16 where it interfaces with a shoulder 26b which extends radially outward from the rotational axis 20.

As seen in the depiction of FIG. 1, this actuating stem 26 is partially housed within a concentric cylindrical dome 12a.

An upper fluid chamber 32 is formed between the upper surface 16a of valve plug 16 and a lower section of the cylindrical dome 12a of the housing 12. This chamber 32 is further defined by the seal member 22 and the actuating stem 26 including the side portions 26a and the lower side of radially extending shoulder 26b.

As depicted in FIG. 1, the upper fluid chamber may receive an inert buffering or sealing agent such as Hooker fluorolube or silicone sealant. This buffering or sealing agent may be injected into chamber 32 through an injection system which includes a shank button head Alemite fitting 33 secured in a passage 35 extending through the housing 12. Alternately, the valve could be factory packed with sealant, which possibly would be satisfactory for the life of the valve.

Any buffering or sealant agent applied to upper chamber 2 is also applied to a lower chamber 79 through a passageway 25 which extends through the plug 16 as illustrated in FIG. 3.

Referring back to FIG. 1, the side and top portions of shoulder 26b of actuating stem 26 are surrounded by a busing 36 which serves to provide bearing surfaces for the actuating stem 26 as it is rotated about axis 20. A third portion 26c of actuating stem 26 of smaller diameter than shoulder 26b is adjacent to and extends axially upwardly from the shoulder portion of 26b and is surrounded by an external sealing member in the form of packing rings 37 which are disposed between the bushings 36 and a further set of bushings 28 which extend along the periphery of actuating stem 26 to the top of the housing dome 12a.

An open ended hole 40 is drilled and tapped in the top portion of actuating stem 26 and this hole threadably receives a take-up bolt 40. The top portion of the actuating stem 26, as well as the take-up bolt 40 are disposed in a bore 48 or a wrench hub 50 which is supported atop th dome section 12a of housing 10 and abutts bushings 28. A thrust washer 54 rests on shoulder 56 formed within the bore 48 and this thrust washer serves to provide a bearing surface for a spring 58 which is optionally inserted to engage a washer 60 which is thus resiliently urged against the underside of the head of the take-up bolt 40. The thrust washer 54 provides a reaction force against the spring 58 whenever the take-up bolt 40 is rotated and advanced into the actuating stem 26.

A handle 62 is fitted within the top portion of the cover 50 and serves as a moment arm to rotate the valve plug 16 about the axis 20. A washer 64 covers the opening in the wrench hub 50 and has a hole 66 through which an Allen wrench may be inserted to rotate the take-up bolt 40. Similarly, handle 62 has an opening 68 which is provided for the same purpose.

Referring now to the bottom side of plug valve 16, an opening in the bottom of the housing 12 is covered by a flange cover 70 which is secured to the housing by bolts 72. A tightening bolt 74 is centrally located and adjustably fitted within the flange cover to extend therethrough and to contact a thrust washer 76. The thrust washer 76 in turn engages a metal diaphragm 78 fitted about a first counterbore in the valve housing 12. A second diaphragm 80 formed of plastic is disposed immediately above the metal diaphragm and fitted about a second smaller counterbore concentric to the first. The tightening bolt 74 serves to transmit a force through the plastic diaphragm 80 to urge the plug upwardly.

The lower fluid chamber 79 is located beneath the plug 16 and is defined by the housing 12, the plastic diaphragm 80, the bottom portion of the plug 16, and an outwardly protruding portion of the seal 22 which is fitted between the plug and the housing. As illustrated in the depiction of FIG. 1, the valve plug 16 is continuously tapered with its bottom portion having a first diametrical dimension which is greater than a smaller second diametrical dimension on the plug's topside 16a which interacts with the activating stem 26.

The illustrated embodiment's use of discrete and separate members for the plug and the actuating stem has multiple advantages. The valve of the illustrated embodiment, for example, has a seal member which is designed to prevent either external fluid leakage out of the flow passage to the atmosphere or internally through the plug within the flow passage beyond the closed valve. However, experience has taught that the sealing relationship between the plug and housing is lost on occasion. In the valve illustrated, the upstream pressure will shift the plug in the downstream direction in such situations, and the plug will be pressure activated to sealingly engage the seal member at the downstream location and more particularly at lips 84 of the housing 12 positioned between the radially outward projections of seal 22 and the flow passage 14. This shifting of the plug is facilitated by having a separate actuating stem which permits relative movement between the plug and the stem. In order to permit this movement, clearance between the plug and the actuating stem in the direction of the flow is greater when the plug is in the closed position. Typical values for the clearance between the plug and the actuating stem would be 0.010 inch in the open position, between the actuating stem portion 26b ends meeting groove surface illustrated in FIG. 1, and 0.060 inch between the same two elements in a direction 90 degrees from that illustrated relationship (which would be in the flow direction of whenever the plug is rotated about axis 20 to the closed position).

It will be noted that the illustrated plug valve 16 is inverted from the typical orientation and that it's profile tapers from a first diametrical dimension at the bottom to a second smaller diametrical dimension at the top of the plug. Further, the lower surface of the plug has a greater surface area exposed to its adjacent fluid chamber than that of the top. This orientation and profile of the plug has significance regardless of whether the valve uses the buffering media. If and when the sealing relationship between the plug 16 and the housing 12 is lost when the valve is not using the buffering media, fluid passes into the chambers 32 and 79. Since the area of the plug 16 exposed to the lower fluid chamber 79 is greater than the corresponding surface at the top of the plug exposed to fluid chamber 32, the net resultant force on the plug tends to urge it upwardly in a direction transverse to the fluid flow. Thus, the plug tends to wedge itself into the seal 22 at both the top and bottom of the flow passages 14, and the valve is self tightening in response to leakage. In addition, the actuating stem 26 is separable from the plug and pressure in the top fluid chamber 32 tends to urge that stem upwardly relative to the valve plug as fluid pressure in that chamber is applied against the underside of shoulder 26b, the stem moving in a piston-like manner. Thus, the design of the valve plug permits two dimensional shifting of the plug 16 (axially and radially with respect to centerline 20) to prevent internal leakage and one dimensional shifting (axially with respect to centerline 20) to prevent external leakage. Further, the separate and discrete nature of the actuating stem 26 also permits that element to move axially with respect to the valve plug 16 and the plug's rotational axis 20. Whenever the fluid pressure in the upper chamber 32 becomes sufficiently high, either as a result of leakage past the seal 22 or the application of a pressurized buffering media, this pressure urges the stem 26 upwardly to compressingly engage the packing rings 37 to form a seal therewith.

As most clearly illustrated in FIG. 2, the actuating stem of the present invention as illustrated stem 26 in the preferred embodiment, has at least three sections 26a, 26b and 26c with an intermediate shoulder section 26b having a greater diametrical dimension than axially adjacent sections 26a and 26c. The stem 26 is formed of a separate element and its discrete nature permits axial movement with respect to the valve plug 16 and the plug's rotational axis 20.

It is thus seen that upper fluid chamber 32 is of variable volume and that whenever fluid pressure is introduced into the chamber this fluid pressure will be communicated to the lower side of shoulder 26b to force upward movement of the stem 26. The present invention's design permits interaction of the stem shoulder 26b and the packing 37 as the shoulder 26b compressingly engages the packing rings 37 to form a seal therebetween and augment the valve's external sealing capabilities. In other words, the shoulder section 26b of the stem 26 is axially movable within an internal way system and the packing member 37 is disposed within this way system.

The valve has similar and additional advantages when a buffering or sealant agent is used. A buffering media introduced into upper chamber 32 will also flow to lower chamber 79 through passageway 25. When the buffering agent is pressurized, it will, due to the unequal surfaces of the plug 16 exposed to chambers 32 and 79, urge the plug 16 constantly upwardly to enhance the sealing between the plug 16 and the seal 22 at the top and bottom of the flow passage 14.

Similarly, pressurized buffering media will constantly urge the seperate valve stem 26 upwardly into compressing, sealing relationship with the packing rings 37. This constant compression of packing rings 37 by the plug stem 26 augments the effectiveness of the seal provided by packing 37, particularly against leakage of low pressure vapors.

Moreover, since the line fluid being valved is internal of the buffering media, any lose of the valve's sealing relationship would force the inert buffering media inwardly rather than permitting the valved line fluid to escape whenever the buffering media pressure is greater than the line pressure.

It will also be appreciated that tightening bolt 74 may be adjusted to increase or decrease the buffering media pressure.

Thus, it is apparent there has been provided, in accordance with the invention, a plug valve that fully satisfies the objects, aims, and advantages set forth above. While the invention has been described in conjunction with specific embodiments thereof, it is evident that may alternatives, modifications, and variations will be apparent to those skilled in the art in light of the foregoing descriptions. Accordingly, it is intended to embrace all such alternatives, modifications, and variations as fall within the scope and spirit of the appended claims.

What is claimed is:

1. A plug valve comprising:
a valve housing having a flow passage therethrough;
a valve plug rotatably fitted within said valve housing across the flow passage for controlling fluid flow in accordance to the plug's angular position relative to said housing;
an actuating stem, said stem having at least two side portions, said stem having a shoulder, said shoulder extending radially outward from and separating said side portions, said stem being operatively connected to said plug, said stem being operatively fitted into a female recess in said plug, said stem being at least partially housed within said housing, said stem having a greater clearance with said plug when said passageway is not in correspondence with said bore; said clearance providing for prevention of internal leakage past said plug when said plug is in the closed position;
an external sealing member circumferentially disposed about the stem proximal to an axially adjacent section with respect to the shoulder on the opposite side thereof with respect to the valve plug;
a first chamber at least partially defined by the end of the plug interacting with the stem, the valve housing and the side of the stem shoulder opposite the external sealing member;
means for controlling the pressure of said fluid irrespective of the fluid pressure in said flow passage;
means for permitting axial movement of the stem in response to fluid pressure in said first chamber to compressingly and sealingly interact the shoulder and the external sealing member.

2. A plug valve as recited in claim 1 wherein the valve housing includes an internal way system in which the shoulder section of the actuating stem is axially movable and wherein the external sealing member is disposed within the way system for compressing and sealing interaction with the shoulder whenever the shoulder is urged axially away from the valve plug by fluid pressure within the first chamber.

3. A plug valve as recited in claim 2 wherein the external sealing member is in the form of packing rings.

4. A plug valve as recited in claim 1 further including a lower fluid chamber partially defined by the end of the plug distal to the stem, the valve plug having a surface area exposure to the lower fluid chamber which is greater than the corresponding surface exposure of the end of the plug interacting with the stem to the first chamber, and means for providing fluid communication between said chamber and the lower chamber.

5. A plug valve as recited in claim 4 further including means for adjusting the pressure of buffering media within the first and lower fluid chambers.

6. A plug valve as recited in claim 4 further including means for adjusting fluid pressure within the first and lower fluid chambers.

7. A plug valve, said plug valve comprising:
a valve housing, said housing having a flow passage therethrough, said housing having an internal way system;
a valve plug, said valve plug being rotatably fitted within said valve housing across said flow passage for controlling fluid flow;
an actuating stem, said stem having at least two side portions, said stem having shoulder, said shoulder extending radially outward from and separating said side portions, said stem being operatively connected to said plug, said stem being operatively fitted into a female recess in said plug, said stem being at least partially housed within said housing, said stem having a greater clearance with said plug when said passageway is not correspondence with said bore, said clearance providing for the prevention of internal leakage past said plug when said plug is in the closed position;
an external sealing member, said sealing member being circumferentially disposed about said stem proximal to an axially adjacent section with respect to said shoulder on the opposite said thereof with respect to the said valve plug, said sealing member being located in said internal way system such that said sealing member compressingly and sealingly interacts with said shoulder whenever said shoulder is urged axially away from said plug by fluid pressure;
a first chamber, said chamber being at least partially defined by the end of said plug interacting with said stem, said valve housing and the side of said stem shoulder opposite said external sealing member, said first chamber being responsive to fluid pressure for compressing and sealing interaction with said shoulder whenever said shoulder is urged axially away from said valve plug, said first chamber having a buffering media;
means for controlling the pressure of said fluid irrespective of fluid pressure in said flow passage;
means for permitting the axial movement of said stem in response to fluid pressure in said first chamber to compressingly and sealingly interact with said shoulder and said external sealing member;
a second chamber, said second chamber being partially defined by the end of said plug distile to said stem, said valve plug having a surface area exposure to said second fluid chamber which is greated than the corresponding surface exposure of the end of said plug interacting with said stem to said first chamber, said second chamber having a buffering media; and
means for providing fluid communication between said first chamber and said second chamber.

8. A plug valve, said plug valve comprising:
a valve housing, said housing having an internal bore extending therethrough, said bore defining a fluid flow passage, said housing having a concentric cylindrical dome;
a valve plug, said plug having a passageway therein, said plug being rotatably fitted within said housing, said plug extending across said flow passage such that fluid flow is controlled through said flow passage, said plug having a femalw recess, said female recess being located on the upper surface of said plug;
a first sealing member, said member being in the form of a liner, said member circumscribing the periphery of said plug, said member being apertured in correspondence with said passageway through said plug, said member being positioned between said plug and said housing;

an actuating stem, said stem having at least two side portions, said stem having a shoulder, said should extending radially outward from and separating said side portions, said stem being operatively connected to said plug, said stem being fitted into said female recess in said plug, said stem being at least partially housing within said concentric cylindrical dome of said housing, said stem having a greater clearance with said plug when said plug passageway is not in correspondence with said housing bore, said clearance providing for the prevention of internal leakage past said plug when said plug is in the closed position;

an upper fluid chamber, said chamber being defined by said upper surface of said plug, said lower surface of said dome, said first sealing member, said lower most side portion of said actuating stem and said lower side of said shoulder;

means for providing bearing surfaces for said actuating stem, said means having an upper and a lower portion, said upper portion extending above the periphery of said actuating stem to the top of said dome;

a second sealing member, said member being disposed between said upper and said lower portions of said means for providing bearing surfaces for said actuating stem.

9. The plug valve as recited in claim 8, said valve further comprising:

means for urging said plug upwards relative to said housing.

10. A plug valve, said plug valve comprising:

a valve housing, said housing having an internal bore extending therethrough, said bore defining a fluid flow passage, said housing having a concentric cylindrical dome;

a valve plug, said plug having a passageway therein, said plug being rotatably fitted within said housing, said plug extending across said flow passage such that fluid flow is controlled through said flow passage, said plug having a female recess, said female recess being located on the upper surface of said plug;

a first sealing member, said member being in the form of a liner, said member circumscribing the periphery of said plug, said member being apertured in correspondence with said passageway through said plug, said member being positioned between said plug and said housing;

an actuating stem, said stem having at least two side portions, said stem having a shoulder, said shoulder extending radially outward from and separating said side portions, said stem being operatively fitted into said female recess in said plug, said stem being at least partially housed within said concentric cylindrical dome of said housing, said stem having a greater clearance with said plug when said passageway is not in correspondence with said bore;

an upper fluid chamber, said chamber being defined by said upper surface of said plug, said lower surface of said dome, said first sealing member, said lower most side portion of said actuating stem and said lower side of said shoulder;

means for providing bearing surfaces for said actuating stem, said means having an upper and a lower portion, said upper portion extending above the periphery of said actuating stem to the top of said dome;

a second sealing member, said member being disposed between said upper and said lower portions of said means for providing bearing surfaces for said actuating stem;

means for urging said plug upward relative to said housing, said means for urging further comprising:

an opening, said opening located in the bottom portion of said housing, said opening having at least two concentric counter bores, said second counter bore having a smaller diameter than said first counter bore;

means for covering said opening;

a tightening bolt, said bolt being centrally located relative to said opening, said bolt being adjustably fitted within said means for covering;

a thrust washer;

a first diaphragm, said first diaphragm being fitted about said first counter bore; and a second diaphragm, said second diaphragm being disposed immediately about said first diaphragm, said second diaphragm being fitted about said second smaller counter bore.

11. The plug valve as recited in claim 10, said valve further comprising:

a lower fluid chamber, said chamber being located beneath said plug, said chamber being defined by said housing, said second diaphragm, said bottom portion of said plug and said first sealing member.

12. The plug valve as recited in claim 10, said valve further comprising:

a buffering agent; and means for injecting said buffering agent into said first chamber.

13. The plug valve as recited in claim 12, said valve further comprising:

a lower fluid chamber, said chamber being formed in said means for urging said plug upwards in relation to said housing, said lower chamber being in fluid communication with said upper fluid chamber;

a buffering agent; and means for injecting said buffering agent into both said upper fluid and said lower fluid chambers.

14. The plug valve as recited in claim 10, said actuating stem further comprising:

means for adjusting said stem in said plug, said means comprising:

a hole, said hole being located in said top portion of said stem, a take-up bolt, said bolt being threadably receivable in said hole, a wrench hub, said hub having at least one shoulder, said hub being supported atop said dome, said hub abutting said uppermost portion of said means for providing bearings surfaces for said actuating stem;

bearing means, said means resting on said shoulder; and means for operating said means for adjusting said stem.

15. The plug valve as recited in claim 10, wherein said clearance between said stem and said plug is approximately 0.010 inch when said plug passage and said housing bore are aligned and approximately 0.060 inch when said plug passage and said housing bore are positioned at approximately a 90° angle in relation to each other.

* * * * *